(12) United States Patent
Grooters et al.

(10) Patent No.: US 7,219,903 B2
(45) Date of Patent: May 22, 2007

(54) HAND TRUCK

(75) Inventors: Charles D. Grooters, Kentwood, MI (US); Thomas J. Grooters, Kentwood, MI (US); Rodney M. McDonald, Sparta, MI (US)

(73) Assignee: Robert Grooters, Grand Rapids, MI (US)

( * ) Notice: Subject to any disclaimer, the term of this patent is extended or adjusted under 35 U.S.C. 154(b) by 167 days.

(21) Appl. No.: 10/426,398

(22) Filed: Apr. 30, 2003

(65) Prior Publication Data

US 2003/0201615 A1    Oct. 30, 2003

Related U.S. Application Data

(60) Provisional application No. 60/376,507, filed on Apr. 30, 2002.

(51) Int. Cl.
*B62B 3/00*    (2006.01)
(52) U.S. Cl. ............... 280/47.27; 280/47.17; 280/47.24; 280/47.131
(58) Field of Classification Search ......... 280/47.12, 280/47.16, 47.17, 47.19, 47.131, 47.27, 47.28, 280/47.34, 47.35, 40, 641; 414/490
See application file for complete search history.

(56) References Cited

U.S. PATENT DOCUMENTS

| | | | | | |
|---|---|---|---|---|---|
| 394,385 | A | * | 12/1888 | McMillan | 414/456 |
| 1,203,194 | A | * | 10/1916 | Haege | 280/641 |
| 2,606,770 | A | * | 8/1952 | Reichert | 280/641 |
| 2,884,257 | A | * | 4/1959 | Menne | 280/40 |
| 3,269,744 | A | * | 8/1966 | Dobson | 280/43.17 |
| 3,666,285 | A | * | 5/1972 | Fertig | 280/47.12 |
| 3,729,206 | A | * | 4/1973 | Cachon et al. | 279/3 |
| 4,460,189 | A | * | 7/1984 | Goff | 280/47.27 |
| 4,480,851 | A | * | 11/1984 | St-Pierre | 280/656 |
| 4,488,733 | A | * | 12/1984 | Hellsten | 280/47.16 |
| 4,726,602 | A | * | 2/1988 | Sanders et al. | 280/654 |
| 4,752,173 | A | * | 6/1988 | Fleming | 414/10 |
| 5,263,727 | A | * | 11/1993 | Libit et al. | 280/40 |
| 5,377,795 | A | * | 1/1995 | Berman | 190/18 A |
| 5,474,313 | A | * | 12/1995 | Marquardt | 280/47.28 |
| 5,511,806 | A | * | 4/1996 | McNair | 280/47.2 |
| 5,765,843 | A | * | 6/1998 | Miller | 280/79.7 |
| 5,890,570 | A | * | 4/1999 | Sadow | 190/18 A |
| 6,446,987 | B2 | * | 9/2002 | Abraham et al. | 280/47.2 |
| 6,561,327 | B1 | * | 5/2003 | Godshaw | 190/18 A |
| 6,663,120 | B1 | * | 12/2003 | Fagerqvist | 280/47.27 |
| 6,709,222 | B2 | * | 3/2004 | Inman, Jr. | 414/490 |

\* cited by examiner

*Primary Examiner*—Christopher P. Ellis
*Assistant Examiner*—Vaughn Coolman
(74) *Attorney, Agent, or Firm*—Price, Heneveld, Cooper, DeWitt & Litton, LLP

(57) ABSTRACT

A hand truck comprising a frame including a first frame portion and a second frame portion, with the first frame portion being substantially perpendicular to the second frame portion. The hand truck further includes at least two first wheels connected to a lower section of the frame, with the at least two first wheels having parallel first axes of rotation. The hand truck also includes at least two second wheels connected to the lower section of the frame, with the at least two second wheels having parallel second axes of rotation. The first axes of rotation are substantially perpendicular to the second axes of rotation, whereby the item placed on the first frame portion can be moved in a first direction along a first line parallel to the second axes of rotation and a second direction along a second line parallel to the first axes of rotation.

8 Claims, 5 Drawing Sheets

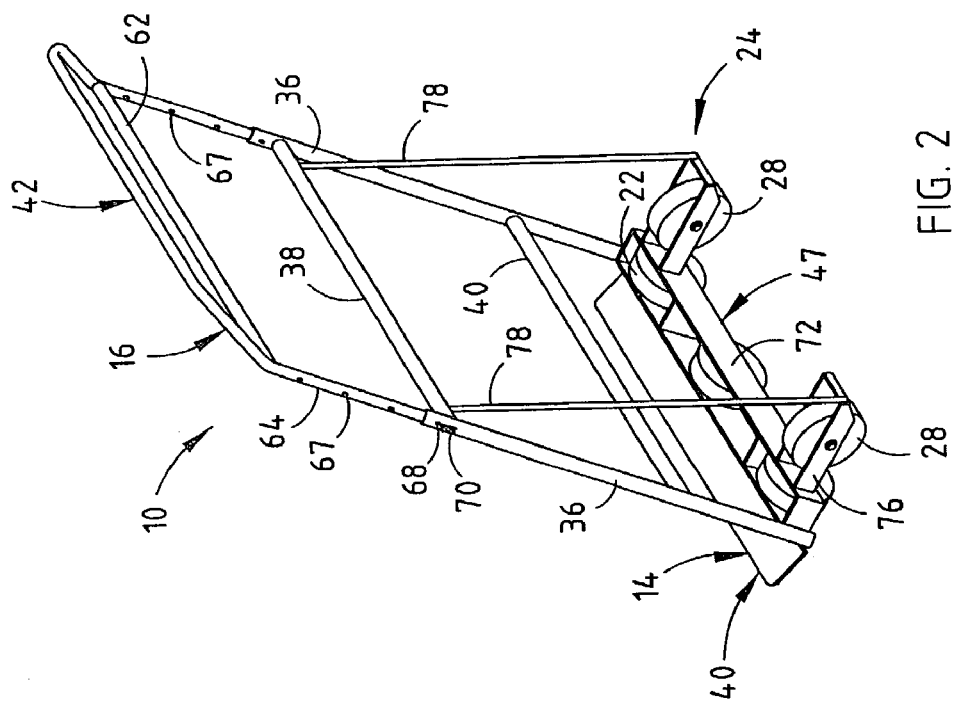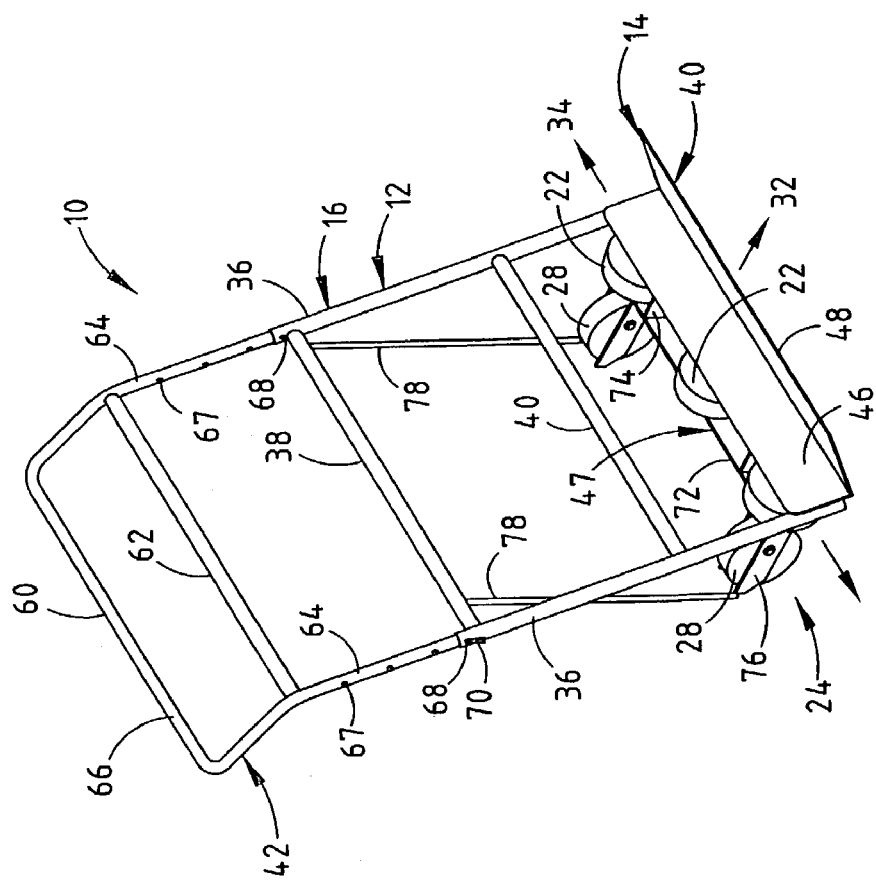

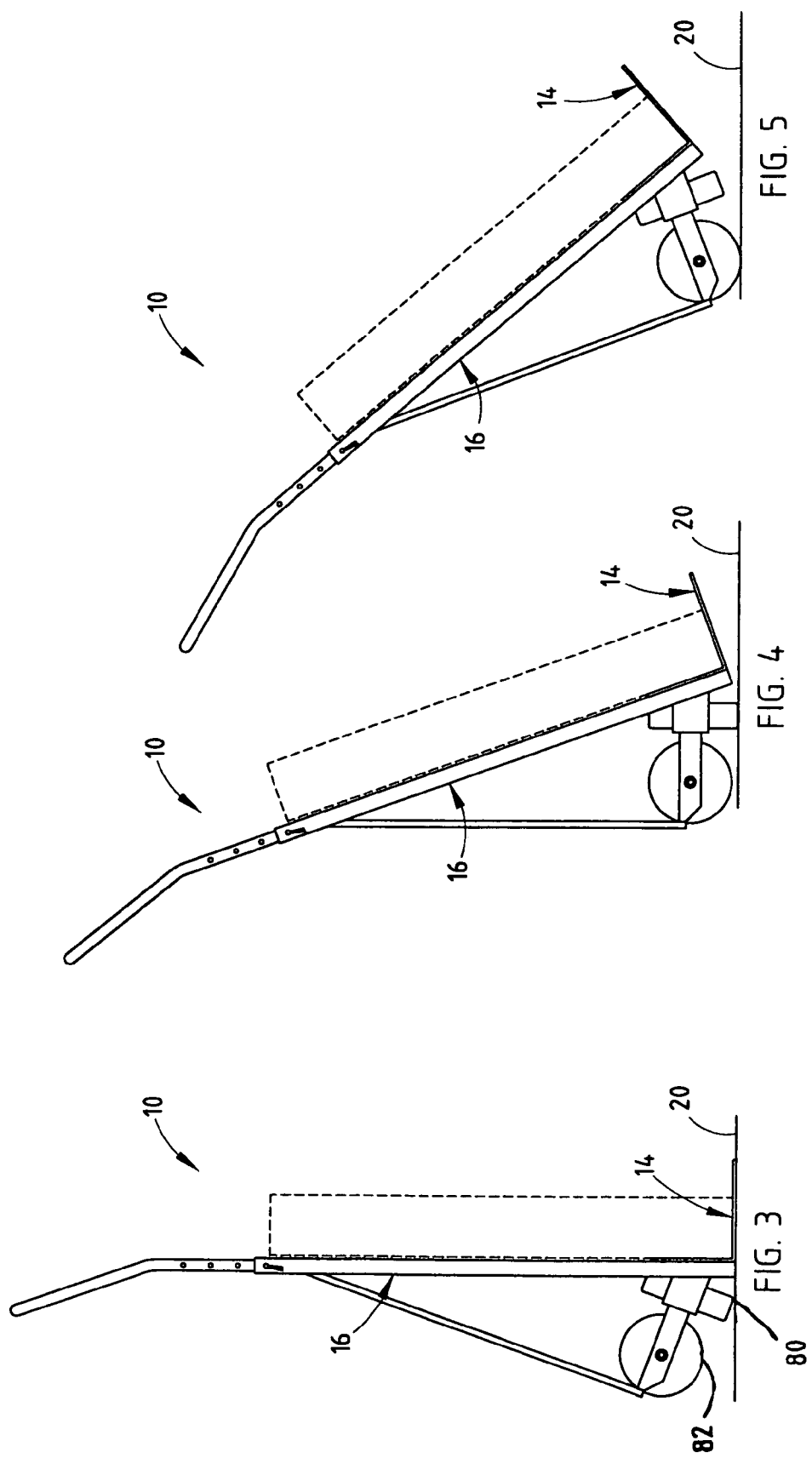

HAND TRUCK

CROSS-REFERENCE TO RELATED APPLICATION

The present invention claims priority to Provisional Patent Application No. 60/376,507, filed on Apr. 30, 2002 entitled HAND TRUCK.

BACKGROUND OF THE INVENTION

The present invention relates to hand trucks, and in particular to hand trucks able to move in more than one direction.

Hand trucks are used to move large items that are not easily lifted by hand. Typically, hand trucks are used in warehouses and the like for moving merchandise about the warehouses and into and out of trucks. Furthermore, hand trucks are used in the moving industry for easily moving boxes full of personal items.

Heretofore, hand trucks have typically included a first handle section and a second lifting section perpendicular to the first handle section. The first handle section included a pair of parallel wheels connected to a lower end of the handle section. Items were moved using the hand trucks by placing the item on the second lifting section and rotating the first handle section about the wheels until the second lifting section is raised off the ground and the hand truck is supported by the wheels. The item can then easily be moved on the wheels. However, if only a little room is available between the item and another item, a wall, etc., the hand truck cannot typically be used to move the item because the wheels can only move the hand truck towards or away from the item, or possibly in a circular motion. Therefore, in situations where space is limited, moving the hand truck towards or away from the item or in a circular motion may not be available.

Accordingly, a hand truck solving the aforementioned disadvantages and having the aforementioned advantages is desired.

SUMMARY OF THE INVENTION

One aspect of the present invention is to provide a hand truck comprising a frame including a first frame portion and a second frame portion, with the first frame portion being substantially perpendicular to the second frame portion. The frame is configured to at least partially support an item on the first frame portion when the first frame portion is resting on a surface. The frame is further configured to at least partially support the item on the first frame portion and at least partially support the item on the second frame portion as the frame is rotated. The hand truck further includes at least two first wheels connected to a lower section of the frame, with the at least two first wheels having parallel first axes of rotation. The hand truck also includes at least two second wheels connected to the lower section of the frame, with the at least two second wheels having parallel second axes of rotation. The first axes of rotation are substantially perpendicular to the second axes of rotation, whereby the item placed on the first frame portion can be moved in a first direction along a first line parallel to the second axes of rotation and a second direction along a second line parallel to the first axes of rotation.

Another aspect of the present invention is to provide a hand truck comprising a frame including a first frame portion and a second frame portion, with the first frame portion being substantially perpendicular to the second frame portion. The hand truck also includes at least two first wheels connected to a lower portion of the frame. The at least two first wheels have parallel first axes of rotation and a first lower extremity. The hand truck further includes at least two second wheels connected to the lower portion of the frame. The at least two second wheels have parallel second axes of rotation and a second lower extremity. The second lower extremity of the at least two second wheels is positioned above the first lower extremity of the first wheels when the first frame portion rests on a surface. The first axes are substantially perpendicular to the second axes. An item can be placed on the first frame portion when the first frame portion rests on the surface. Furthermore, the frame can be rotated about an axis parallel to the second axes to a first position where the first wheels contact the surface, whereby the hand truck can be moved on the first wheels in a direction parallel to the second axes. Moreover, the frame can be rotated about the axis parallel to the second axes to a second position where the second wheels contact the surface, whereby the hand truck can be moved on the second wheels in a direction parallel to the first axes or in a circle about the second wheels.

These and other features, advantages, and objects of the present invention will be further understood and appreciated by those skilled in the art by reference to the following specification, claims and appended drawings.

BRIEF DESCRIPTION OF THE DRAWINGS

FIG. 1 is a front perspective view of a first embodiment of a hand truck of the present invention.

FIG. 2 is a rear perspective view of the first embodiment of the hand truck of the present invention.

FIG. 3 is a side view of the hand truck in a loading position.

FIG. 4 is a side view of the hand truck in a first movement position.

FIG. 5 is a side view of the hand truck in a second movement position.

DETAILED DESCRIPTION OF THE PREFERRED EMBODIMENTS

Figure 7:
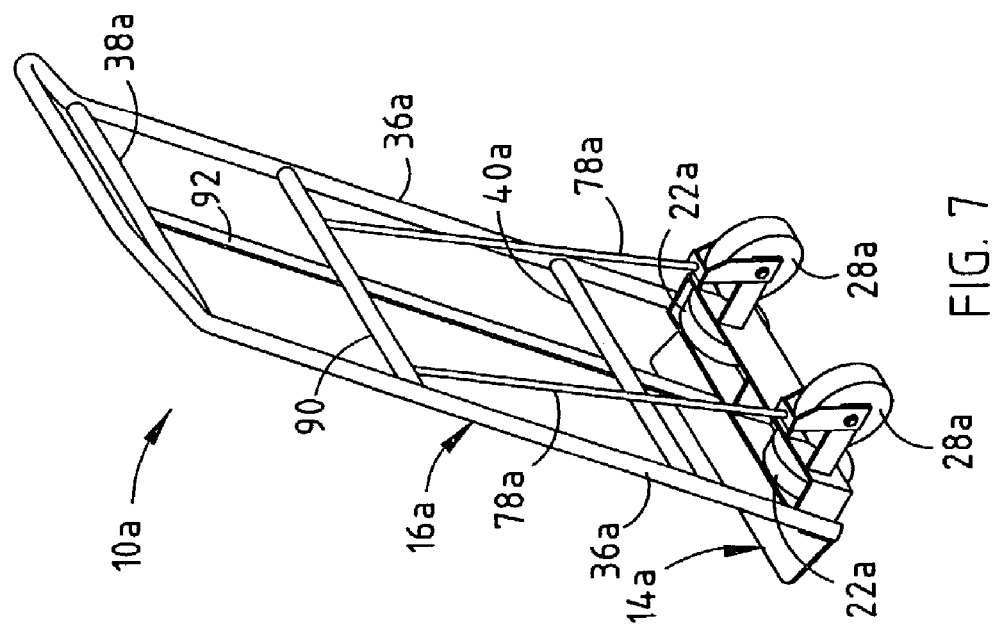
FIG. 7 is a rear perspective view of the second embodiment of the hand truck of the present invention.

For purposes of description herein, the terms "upper," "lower," "right," "left," "rear," "front," "vertical," "horizontal," and derivatives thereof shall relate to the invention as orientated in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The reference number 10 (FIG. 1) generally designates a hand truck embodying the present invention. In the illustrated example, the hand truck 10 comprising a frame 12 including a first frame portion 14 and a second frame portion 16. The frame 12 is configured to at least partially support an item on the first frame portion 14 when the first frame portion 14 is resting on a surface 20 (see FIG. 3). The frame 12 is further configured to at least partially support the item on the first frame portion 14 and at least partially support the item on the second frame portion 16 as the frame 12 is rotated. The hand truck 10 further includes at least two first wheels 22 connected to a lower section 24 of the frame 12, with the at least two first wheels 22 having parallel first axes of rotation. The hand truck 10 also includes at least two second wheels 28 connected to the lower section 24 of the frame 12, with the at least two second wheels 28 having parallel second axes of rotation. The first axes of rotation are substantially perpendicular to the second axes of rotation, whereby the item placed on the first frame portion 14 can be moved in a first direction 32 along a first line parallel to the second axes of rotation and a second direction 34 along a second line parallel to the first axes of rotation.

In the illustrated example, the frame 12 includes the first frame portion 14 configured to accept the item thereon and the second frame portion 16 used to move the first frame portion 14. The second frame portion 16 comprises a pair of side support rails 36 connected by an upper cross support 38 and a lower cross support 40. A nose plate 44 is connected to lower ends of the side support rails 36. The nose plate 44 includes a first section 46 and a perpendicular second section 48. The first section 46 is connected to the side support rails 36 and the second section 48 extends outwardly from the first section 46. The frame 12 also includes a handle 42 and a wheel support structure 47. In the illustrated example, the second frame portion 16 includes the pair of side support rails 36, the upper cross support 38, the lower cross support 40, the handle 42, the wheel support structure 47 and the first section 46 of the nose plate 44. Likewise, the first frame portion 14 includes the second section 48 of the nose plate 44. Although the frame 12 is shown as including a skeleton frame, the frame 12 could include a solid body or any other frame configuration.

The illustrated handle 42 of the second frame portion 16 of the frame 12 easily moves the lower section 24 of the second frame portion 16 and the first frame portion 14. The handle 42 includes a U-shaped grip 60 and a handle cross-support 62. The U-shaped grip 60 includes a pair of telescoping support tubes 64 connected by a gripping section 66. The handle cross-support 62 extends between the support tubes 64 and is parallel to the gripping section 66. Each of the support tubes 64 is configured to be telescopingly inserted into the side support rails 36. The support tubes 64 include a plurality of holes 67 adapted to align with one set holes 68 through the side support rails 36. A pin 70 is placed through the holes 68 in the side support rails 36 and the aligned holes 67 of the support tubes 64. The holes 68 in the side support rails 36 are adapted to align with several holes 67 in the support tubes 64 as the support tubes 64 are telescoped into and out of the side support rails 36, to thereby selectively alter the height of the second frame portion 16.

In the illustrated example, the first wheels 22 and the second wheels 28 are connected to the lower section 24 of the frame 12 and allow the hand truck 10 to move easily in two linear directions or in a circular direction. The wheel support structure 47 connects the first wheels 22 and the second wheels 28 to the side support rails 36. The wheel support structure 47 includes a U-shaped wheel support plate 72 extending rearwardly from the side support rails 36 and the first section 46 of the nose plate 44. The first wheels 22 are located in a line and are connected to the U-shaped wheel support plate 72. A rib 74 extends between the U-shaped wheel support plate 72 and the first section 46 of the nose plate 44, between each of the first wheels 22. In the illustrated example, the at least two first wheels 22 includes three first wheels 22. The wheel support structure 47 further includes a pair of wheel housings 76 extending rearwardly from the U-shaped wheel support plate 72. Each of the wheel housings 76 have one of the second wheels 28 located therein. Preferably, the second wheels 28 have co-linear axes of rotation. A strut 78 extends from the rear of each wheel housing 76 to the upper cross support 38 to provide stability to the wheel support structure 47.

The illustrated hand cart 10 is preferably used by first placing the first frame portion 14 on the surface 20 (see FIG. 3) in a loading position and placing the item on the first frame portion 14. The second frame portion 16 is then rotated until the first wheels 22 contact the surface 20. Once the first wheels 22 contact the surface 20, the first frame portion 14 is off of the surface 20 (FIG. 4). The hand cart 10 is then in a first movement position, allowing the hand cart 10 to be moved in the first direction 32 along a first line parallel to the second axes of rotation of the second wheels 28. The second frame portion 16 can then be further rotated until the second wheels 28 contact the surface 20. As illustrated in FIG. 3, the first wheels 22 have a first lower extremity 80 and the second wheels 28 have a second lower extremity 82 being positioned above the first lower extremity 80 of the first wheels 22 when the first frame portion 14 rests on the surface 20. Once the second wheels 28 contact the surface 20, the first frame portion 14 and the first wheels 22 are off the surface and the hand cart 10 is in a second movement position. In the second movement position, the hand cart 10 can be moved in the second direction 34 along a second line parallel to the first axes of rotation of the first wheels 22. Accordingly, the frame 12 at least partially supports the item on the first frame portion 14 when the first frame portion 14 is resting on the surface and at least partially supports the item on the first frame portion 14 and the second frame portion 16 as the frame 12 is rotated.

Figure 6:
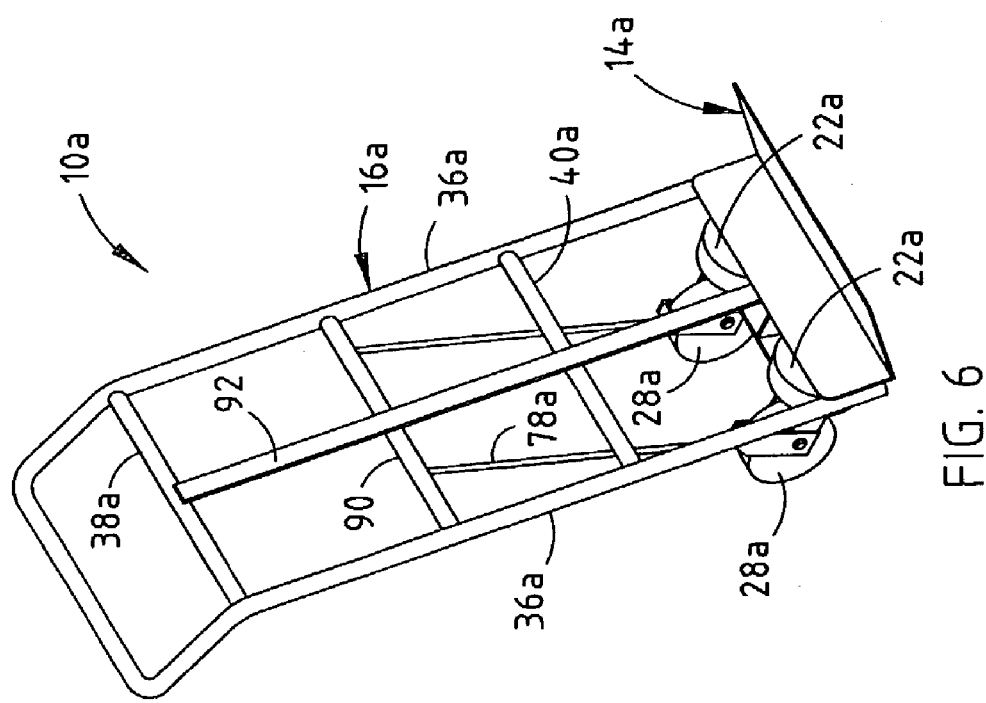
FIG. 6 is a front perspective view of a second embodiment of the hand truck of the present invention.

The reference numeral 10a (FIGS. 6-7) generally designates another embodiment of the present invention, having a second embodiment for the hand truck. Since the hand truck 10a is similar to the previously described hand truck 10, similar parts appearing in FIGS. 1-2 and FIGS. 6-7, respectively, are represented by the same, corresponding reference number, except for the suffix "a" in the numerals of the latter. The second embodiment of the hand truck 10a is identical to the previously described hand truck 10, except that the second embodiment of the hand truck 10a has smaller lateral dimensions, only two first wheels 22a, a middle cross support 90 extending between the pair of side support rails 36a and located between the upper cross support 38a and the lower cross support 40a, and a middle support rail 92 extending between the upper cross support 38a and the lower cross support 40a and located between the pair of side support rails 36a. Furthermore, the struts 78a in the second embodiment of the hand truck 10a are connected at an upper end thereof to the middle cross support 90. The second embodiment of the hand truck 10a is used in the same manner as the first embodiment of the hand truck 10 and can be moved in the first direction 32 and the second direction 34.

Figure 9:
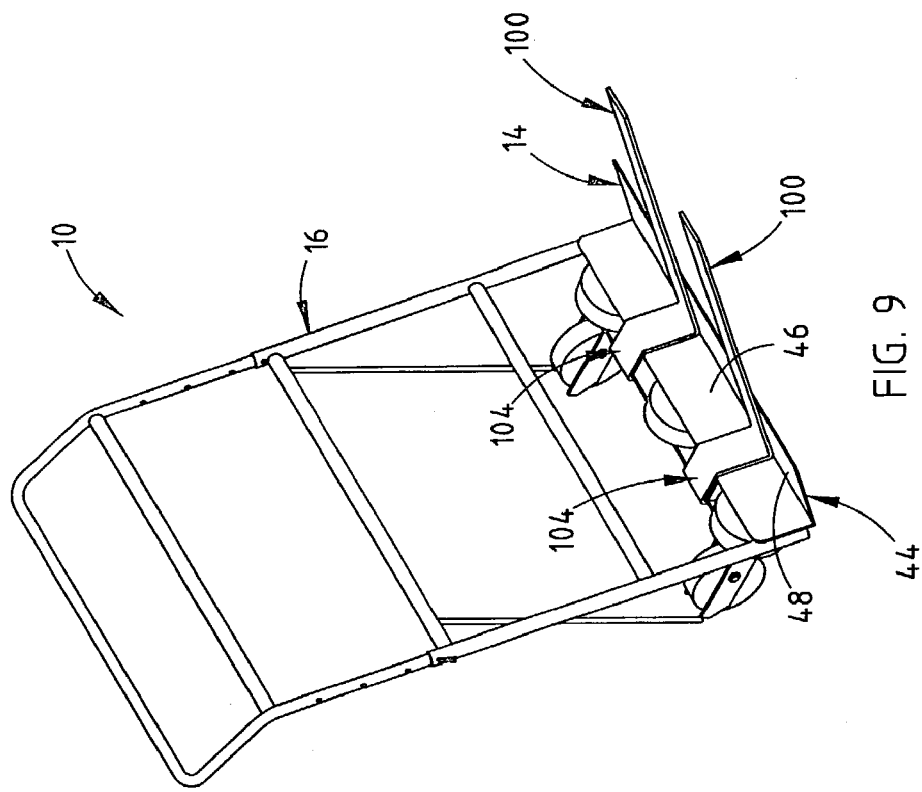
FIG. 9 is a perspective view of the extenders connected to the hand truck.
Figure 8:
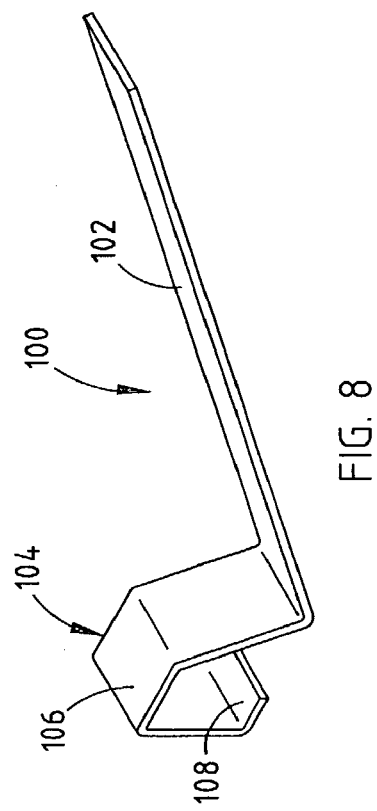
FIG. 8 is a perspective view of extenders used with the hand truck of the present invention.

FIG. 8 illustrates an extender 100 that can be used with the hand truck 10 and 10a to extend a horizontal support area for supporting the item. The extender 100 is preferably made from one piece of metal and includes a flat support section 102 and a hooking section 104 connected to the flat support section 102. The hooking section 104 includes an inverted U-shaped segment 106 and a lip section 108. As illustrated in FIG. 9, a pair of the extenders 100 are used by placing the U-shaped segment 106 of the hooking section 104 over the first section 46 of the nose plate 44 and the U-shaped wheel support plate 72. The lip section 108 of the U-shaped segment 106 of the hooking section 104 then hooks under the U-shaped wheel support plate 72 and the flat support section 102 of the extender 100 rests on the second section 48 of the nose plate 44. Accordingly, the support area for the item placed on the second section 48 of the nose plate 44 is enlarged, thereby allowing the hand truck 10 and 10a to easily carry items having a large horizontal cross section.

Figures 10, 11:
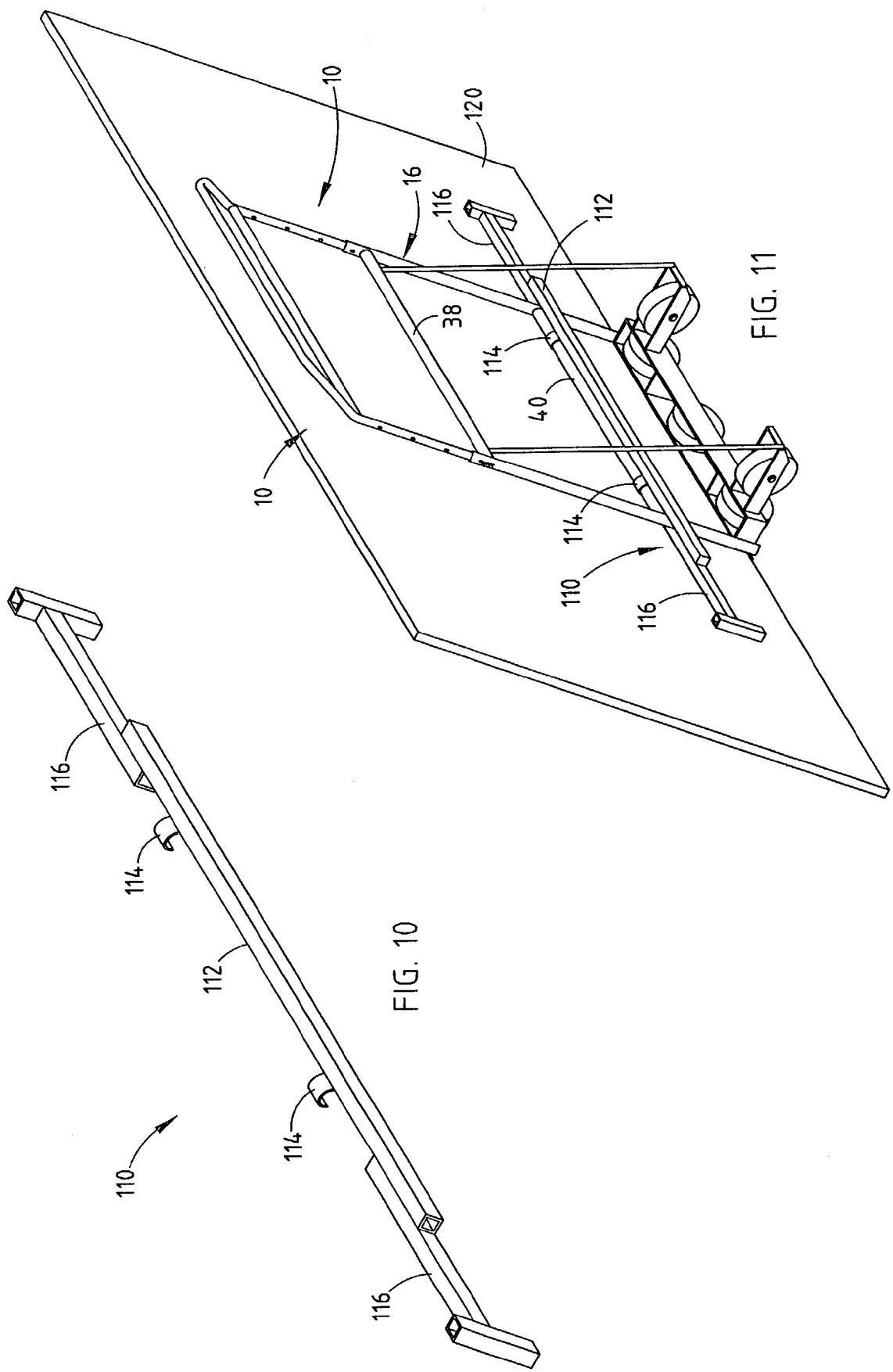
FIG. 10 is a perspective view of supports used with the hand truck of the present invention.
FIG. 11 is a perspective view of the supports connected to the hand truck.

FIG. 10 illustrates a support 110 that can be used with the hand truck 10 and 10a to extend a vertical support area for supporting the item. The support 110 includes a main bar 112 having a pair of inverted U-shaped hooks 114 extending therefrom and a T-shaped side bar 116 extending from each side of the main bar 112. As illustrated in FIG. 11, the support 110 is used by placing main bar 112 adjacent a rear side of the lower cross support 40. The hooks 114 hook around a top of the lower cross support 40 to maintain the support 110 in position. Accordingly, the support 110 extends outwardly from each side of the frame 12 to thereby at least partially support the item 120 as the frame 12 is rotated. It is contemplated that the support 100 could be connected to the upper cross support 38 or more than one support 110 could be used, with each support connected to a cross support.

In the forgoing description, it will be readily appreciated by those skilled in the art that modifications may be made to the invention without departing from the concepts disclosed herein. Such modifications are to be considered as included in the following claims, unless these claims by their language expressly state otherwise.

We claim:

1. A hand truck comprising:
   a frame comprising a first frame portion and a second frame portion, the first frame portion being substantially perpendicular to the second frame portion;
   at least two first wheels connected to a lower portion of the frame, the at least two first wheels having parallel first axes of rotation, the at least the first wheels further having a first lower extremity; and
   at least two second wheels connected to the lower portion of the frame, the at least two second wheels having parallel second axes of rotation, the second wheels further having a second lower extremity being positioned above the first lower extremity of the first wheels when the first frame portion rests on a surface;
   the first axes being substantially perpendicular to the second axes;
   wherein an item can be placed on the first frame portion when the first frame portion rests on the surface;
   wherein the frame can be rotated about an axis parallel to the second axes to a first position where the first wheels contact the surface, whereby the hand truck can be moved on the first wheels in a direction parallel to the second axes;
   wherein the frame can be rotated about the axis parallel to the second axes to a second position where the second wheels contact the surface, whereby the hand truck can be moved on the second wheels in a direction parallel to the first axes or in a circle about the second wheels; and
   wherein the first wheels are located between the second wheels and the second frame portion of the frame.

2. The hand truck of claim 1, wherein:
the second frame portion includes the lower portion and a handle;
the lower portion includes a pair of side support rails; and
the handle has a pair of support tubes, the support tubes being configured to slide within the support rails of the lower portion to thereby selectively alter the height of the second frame portion.

3. The hand truck of claim 1, wherein:
the at least two first wheels comprise three first wheels.

4. The hand truck of claim 1, wherein:
the at least two first wheels comprise two first wheels.

5. The hand truck of claim 1, wherein:
the second axes are co-linear.

6. The hand truck of claim 1, further including:
horizontal extenders configured to be connected to the lower portion of the frame, the horizontal extenders extending from the first frame portion to thereby extend a horizontal support area for supporting the item.

7. The hand truck of claim 1, further including:
at least one support configured to be connected to the frame, the at least one support extending outwardly from each side of the frame to thereby at least partially support the item as the frame is rotated.

8. The hand truck of claim 1, wherein:
the at least two first wheels and the at least two second wheels are permanently fixed in position relative to the frame and to each other.

* * * * *

UNITED STATES PATENT AND TRADEMARK OFFICE
CERTIFICATE OF CORRECTION

PATENT NO. : 7,219,903 B2  Page 1 of 1
APPLICATION NO. : 10/426398
DATED : May 22, 2007
INVENTOR(S) : Charles D. Grooters et al.

It is certified that error appears in the above-identified patent and that said Letters Patent is hereby corrected as shown below:

Column 3, line 56;
  After "set" insert --of--.
Column 5, claim 1, line 49;
  "the" should be --two--.
Column 6, claim 6, line 40;
  Before "connected" insert --removably--.
Column 6, claim 7, line 45;
  Before "connected" insert --removably--.

Signed and Sealed this

Fourth Day of September, 2007

JON W. DUDAS
*Director of the United States Patent and Trademark Office*